S. Z. DE FERRANTI.
TIRE.
APPLICATION FILED MAY 2, 1908.

990,350.

Patented Apr. 25, 1911.

ATTEST
Bent. H. Stahl
Ewd L. Tolson

INVENTOR
Sebastian Z. De Ferranti
By Spear, Middleton, Donaldson & Spear
ATTYS

UNITED STATES PATENT OFFICE.

SEBASTIAN ZIANI DE FERRANTI, OF GRINDLEFORD, ENGLAND.

TIRE.

990,350.  Specification of Letters Patent.  Patented Apr. 25, 1911.

Application filed May 2, 1908. Serial No. 430,587.

*To all whom it may concern:*

Be it known that I, SEBASTIAN ZIANI DE FERRANTI, a subject of the King of Great Britain and Ireland, and residing at Grindleford, in the county of Derby, England, have invented a certain new and useful Tire, of which the following is a specification.

My invention relates to tires, and has for its object to provide an improved form of tire which is especially suitable for withstanding excessive wear and tear.

My invention consists in the improved combinations of parts to be hereinafter described and claimed.

Figure 1:
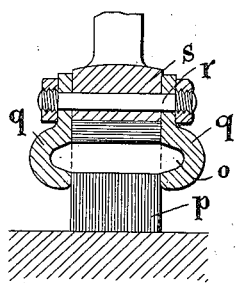
Figure 2:
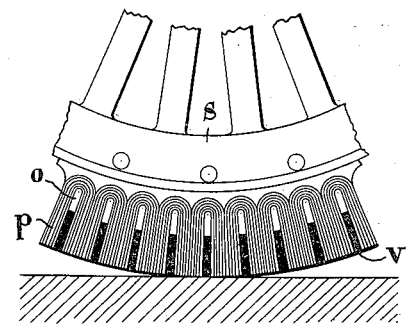
Figure 3:
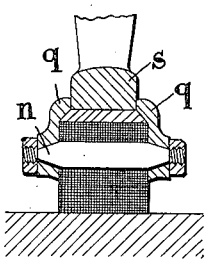
Figure 5:
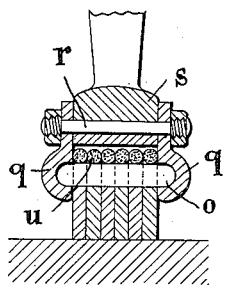
Figure 4:
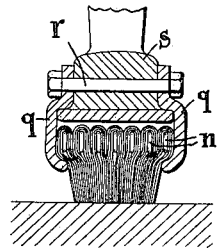

Referring now to the accompanying drawings which illustrate my invention and form part of my specification, Figures 1 and 2 show a cross-section and elevation respectively of part of a tire constructed according to my invention. Fig. 3 shows a cross-sectional elevation of a tire of a somewhat modified form to that shown in Figs. 1 and 2. Fig. 4 shows a cross-sectional elevation of another modification in which the "former" members are arranged circumferentially. Fig. 5 shows a cross-sectional elevation of a tire which is built up on cord-like elements.

In carrying my invention into effect according to one form, I construct the tire by looping pile-like elements around suitable former elements, the pile-like elements being formed of individual filaments twisted, plaited, woven, or otherwise stranded together or combined in the form of cords, ribbons or tapes. The fibers may be of cotton, artificial silk, cellulose or other material, and may be combined with wires if desired, the whole being then vulcanized into a homogeneous mass. If wire is used, it should be chemically cleaned before being incorporated with the rubber whereas to secure a thorough impregnation of any fibrous material employed and consequently a better adherence of the rubber, the fibrous material should preferably be first treated to free it from moisture, oils, fats and so forth. Finally, as much as possible of the air in and between the fibers should be removed by a vacuum treatment, and the rubber impregnation be completed under pressure.

I wish to emphasize the fact that I regard the preliminary treatment of the fibers as indicated, to be essential to success, as otherwise it appears impossible to obtain proper adherence between the fibrous material and the rubber, whether the fibrous material be formed of filamentous elements arranged at right angles to the tread, or whether the material be formed of textile fabric on edge. In other words, it is necessary to impregnate or cover the pile elements with rubber before building them up into the pile. By such preliminary process I obtain a very great strength across the grain either in one or two dimensions as the case may be, so that the final material has all the wearing properties of fiber on edge together with the strength to resist cutting and puncture, equal to that of the best solid rubber.

I shall now describe the examples of tire which I have illustrated in the accompanying drawings, and which I wish to be regarded as typical examples of my invention, without limitation of the same. Thus, according to the forms illustrated in Figs. 1 and 2, former members, $o$, may be arranged transversely as regards the tire, $p$, their projecting ends being received and clamped by side pieces, $q$, secured by bolts, $r$, to the rim, $s$, of the tires or in some cases as illustrated in Fig. 3, the formers, $n$, may act as bolts, the side clamps engaging with projections on the rim.

According to a modification the formers, $n$, Fig. 4, may be arranged circumferentially instead of transversely, and of lesser circumference than, the side clamps, $q$, which by compression retain the former and elements in position being arranged as shown, while in other cases the formers may be arranged obliquely and the side clamp arranged to correspond. These former structures described are also useful when the structure is not strictly a pile but only a semi-pile or pile-like structure such as would be given by looping tapes or cords, $u$, Fig. 5, around the formers, $o$. Where necessary I may use filling pieces, $v$, to compensate for the thickness of the formers, such filling pieces being preferably formed of a fabric or structure in which all the threads run in one direction, and I may similarly provide a suitable shaped base on which to bed the curved backs of the former or other groups of pile elements.

I wish it to be understood that the above examples of my invention are simply to be regarded as typical and not in any way limiting the scope of the same, as it will be evident that many modifications may be made by those skilled in the art without departing beyond the scope of my invention.

I claim—

1. In combination, a wheel rim, outwardly extending flanges on said rim, a plurality of former members secured in position by said flanges together with a plurality of filamentous elements each looped around a former member to extend radially from the rim center, said filamentous elements being vulcanized together to form a homogeneous mass.

2. In combination, a wheel rim, a plurality of former members arranged around the circumference of said rim, a plurality of wear-resisting elements forming the bulk of the tire looped around said former members to extend radially from the wheel rim center, together with a plurality of filling pieces oppositely disposed to said former members.

3. In combination, a wheel rim, outwardly extending flanges on said rim, a plurality of former members clamped between said flanges and acting as bolts for same, together with a plurality of filamentous elements all looped around said formers to extend radially from the wheel rim center, said filamentous elements being vulcanized together to form a homogeneous mass.

4. In combination, a wheel rim, a filamentous tread, and tread supporting means on said rim, the filamentous tread elements being looped around said supporting means to extend outwardly from said rim, as set forth.

5. In combination, a filamentous tire tread and tire tread supporting means, the filamentous tread elements being vulcanized together to form a homogeneous mass and looped around said supporting means, as set forth.

In testimony whereof, I affix my signature in presence of two witnesses.

SEBASTIAN ZIANI DE FERRANTI.

Witnesses:
WILLIAM DUNCAN DAVIDSON,
FRED BLACKBURN.